United States Patent
Kandil et al.

(10) Patent No.: US 10,041,692 B2
(45) Date of Patent: Aug. 7, 2018

(54) REGENERATION AIR MIXING FOR A MEMBRANE BASED HYGROSCOPIC MATERIAL DEHUMIDIFICATION SYSTEM

(71) Applicant: Carrier Corporation, Farmington, CT (US)

(72) Inventors: Sherif Kandil, Ellington, CT (US); Zidu Ma, Ellington, CT (US); Rajiv Ranjan, Vernon, CT (US); Gary D. Winch, Colchester, CT (US)

(73) Assignee: CARRIER CORPORATION, Farmington, CT (US)

( * ) Notice: Subject to any disclaimer, the term of this patent is extended or adjusted under 35 U.S.C. 154(b) by 206 days.

(21) Appl. No.: 14/185,078

(22) Filed: Feb. 20, 2014

(65) Prior Publication Data

US 2014/0238057 A1 Aug. 28, 2014

Related U.S. Application Data

(66) Substitute for application No. 61/769,474, filed on Feb. 26, 2013.

(51) Int. Cl.
*F25D 23/00* (2006.01)
*F24F 3/14* (2006.01)
*B01D 53/26* (2006.01)

(52) U.S. Cl.
CPC .......... *F24F 3/1411* (2013.01); *B01D 53/263* (2013.01); *F24F 3/1417* (2013.01); *F24F 2003/1435* (2013.01); *F24F 2003/1458* (2013.01); *F24F 2203/026* (2013.01)

(58) Field of Classification Search
CPC .................. F24F 3/1411; F24F 3/1417; F24F 2003/1435; F24F 2003/1458; F24F 2203/026

USPC .......................................................... 62/271
See application file for complete search history.

(56) References Cited

U.S. PATENT DOCUMENTS

| | | | | |
|---|---|---|---|---|
| 4,955,205 | A * | 9/1990 | Wilkinson | ............ F24F 3/1417 62/176.4 |
| 5,181,387 | A | 1/1993 | Meckler | |
| 6,684,649 | B1 * | 2/2004 | Thompson | ........... B01D 53/263 62/272 |
| 8,268,060 | B2 | 9/2012 | Hargis et al. | |
| 2003/0221438 | A1 | 12/2003 | Rane et al. | |

(Continued)

FOREIGN PATENT DOCUMENTS

| | | |
|---|---|---|
| EP | 2339252 A1 | 6/2011 |
| IN | 2020MUM2009 | 2/2012 |

(Continued)

OTHER PUBLICATIONS

EP Communication; Extended European Search Report; Application No. 14156733.9-1008/2770266; dated Feb. 13, 2018; pp. 1-7.

*Primary Examiner* — Frantz Jules
*Assistant Examiner* — Steve Tanenbaum
(74) *Attorney, Agent, or Firm* — Cantor Colburn LLP

(57) ABSTRACT

A contactor for an air temperature and humidity control device is provided including a plurality of contact modules. Each contact module has a generally porous sidewall configured to define an internal space through which a hygroscopic material flows. A first airstream passes over a first portion of the plurality of contact modules. A second airstream passes over a second portion of the plurality of contact modules.

19 Claims, 3 Drawing Sheets

(56) References Cited

U.S. PATENT DOCUMENTS

| | | |
|---|---|---|
| 2008/0023666 A1 | 1/2008 | Gurin |
| 2009/0095162 A1* | 4/2009 | Hargis ................. B01D 53/263 96/245 |
| 2011/0041537 A1 | 2/2011 | Pun |
| 2011/0067426 A1 | 3/2011 | Hwang et al. |
| 2011/0132027 A1 | 6/2011 | Gommed et al. |
| 2012/0186281 A1 | 7/2012 | Vandermeulen et al. |
| 2012/0304862 A1 | 12/2012 | Taylor et al. |
| 2013/0056177 A1* | 3/2013 | Coutu ................... F28D 19/042 165/96 |

FOREIGN PATENT DOCUMENTS

| | | | |
|---|---|---|---|
| WO | 2004081462 A1 | 9/2004 | |
| WO | 2008022426 A1 | 2/2008 | |
| WO | 2011062808 A1 | 5/2011 | |
| WO | WO 2011062808 A1 * | 5/2011 | ........... B01D 53/263 |
| WO | 2011090438 A1 | 7/2011 | |
| WO | 2012042553 A1 | 4/2012 | |

* cited by examiner

REGENERATION AIR MIXING FOR A MEMBRANE BASED HYGROSCOPIC MATERIAL DEHUMIDIFICATION SYSTEM

CROSS-REFERENCE TO RELATED APPLICATIONS

This application claims the benefit of U.S. provisional patent application Ser. No. 61/769,474 filed Feb. 26, 2013, the entire contents of which are incorporated herein by reference.

BACKGROUND OF THE INVENTION

The invention relates generally to an air temperature and humidity control device, and more particularly, to an air temperature and humidity control device intended for use in hot and humid environments.

Conventional air conditioning systems generally do not perform humidity control functions. In case humidity control is desired, air conditioners based on direct expansion (DX) may be operated to condense moisture in the air through supercooling. The drier, supercooled air is then reheated for comfort before entering into a facility to be air conditioned. Significant energy is consumed during the supercooling and reheating, which renders the process inefficient. Moreover, water condensation on the metallic DX coil may cause corrosion problems, which adds to the maintenance cost of the air conditioning systems.

In light of the need for more efficient humidity control, air conditioning system with desiccant wheels separated from temperature control units have been developed. The desiccant wheel is loaded with a solid desiccant and is positioned just downstream of the temperature control unit so that cooled air transversely passes a ¾ section of the rotating desiccant wheel, during which the moisture in the air is absorbed by the desiccant. The remaining ¼ section of the desiccant wheel is reheated so that the absorbed moisture can be desorbed to regenerate the desiccant. While capable of achieving low humidity outputs, systems based on desiccant wheels may be space-consuming and may suffer from lack of efficiency, as heating energy is required to regenerate the desiccant. Moreover, because the desiccant wheel is relatively cumbersome and not easy to install or uninstall, the capacity and operation of the systems based on desiccant wheels are generally not modular enough to accommodate a wide range of operations.

Besides desiccant wheels, humidity control may be achieved with an air conditioning system having a heat pump coupled to a liquid desiccant loop so that the liquid desiccant, such as lithium chloride, can be cooled and heated by the heat pump. The desiccant loop includes two contact towers loaded with packing materials. Several sprinkler are provided at the top end of the tower to distribute the liquid desiccant (cooled or heated by the heat pump) onto the packing materials, while air is blown form the bottom end of the contact tower as the liquid desiccant trickles down the packing material. As a result of the direct contact between the desiccant and air, water may be absorbed from the air into the desiccant or desorbed from the desiccant into the air. Simultaneously, the air may be heated or cooled by the liquid desiccant.

Because of its integration with a heat pump, the liquid desiccant system discussed above requires less energy for the desorbing of water from the liquid desiccant, i.e., the regeneration of the liquid desiccant. However, as the operation of the system requires direct contact between numerous streams of liquid desiccant and air, significant amount of noises, e.g. bubbling noise, are generated by the system, which may disturb the ambience of the room or facility that is the subject of the system. The entrainment of liquid desiccant droplets into the air stream is inherent to spraying direct contact technologies. Such liquid desiccant entrainment (or liquid desiccant carryover) can cause corrosion of ductwork and human health issues. Moreover, similar to the desiccant wheels, the contact towers of the above-discussed system are relatively cumbersome in construction and not easy to modulate to accommodate a wide range of operations.

BRIEF DESCRIPTION OF THE INVENTION

According to one embodiment of the invention, a contactor for an air temperature and humidity control device is provided including a plurality of contact modules. Each contact module has a generally porous sidewall configured to define an internal space through which a hygroscopic material flows. A first airstream passes over a first portion of the plurality of contact modules. A second airstream passes over a second portion of the plurality of contact modules.

According to one embodiment of the invention, an air temperature and humidity control device is provided including a heat pump. The heat pump has a condenser, an expansion device, an evaporator, and a compressor. A refrigerant circulates through the heat pump. A humidity controller includes a first contactor having a plurality of contact modules. Each contact module has a porous sidewall that defines an internal space through which a hygroscopic material flows. A first blower generates a first airflow having a first airstream in communication with the sidewalls of a first portion of the plurality of contact modules and a second airstream in communication with the sidewalls of the second portion of the plurality of contact modules.

According to one embodiment of the invention, a method of controlling air humidity and temperature is provided including circulating a refrigerant in a heat pump having a condenser and an evaporator. A desiccant is circulated in a humidity controller. The humidity controller includes a first contactor having a plurality of contact modules. Each contact module includes a porous sidewall that defines an internal space through which a hygroscopic material flows. A first airstream is generated in communication with the sidewalls of a first portion of the plurality of contact modules. A second airstream is generated in communication with the sidewalls of a second portion of the plurality of contact modules.

These and other advantages and features will become more apparent from the following description taken in conjunction with the drawings.

BRIEF DESCRIPTION OF THE DRAWING

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION OF THE INVENTION

Figure 1:
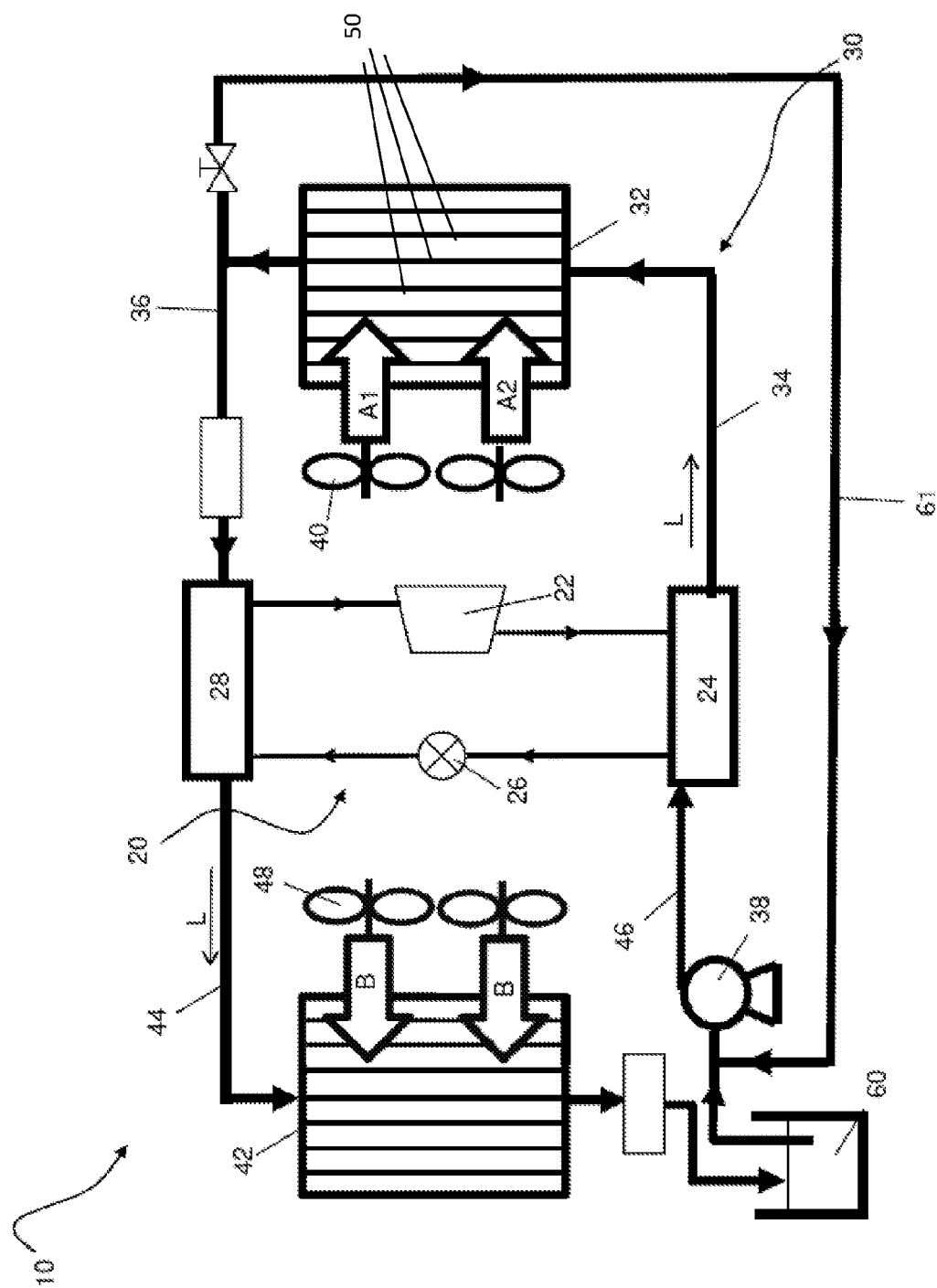
FIG. 1 is a schematic diagram of an air temperature and humidity control device according to an embodiment of the invention.

This disclosure is generally related to an improved air temperature and humidity control device 10. In a first embodiment, schematically illustrated in FIG. 1, the device 10 includes a heat pump 20 and a humidity controller 30. The heat pump 20 may include a compressor 22, a condenser 24, an expansion device 26, and an evaporator 28. In operation, a refrigerant R is circulated through the heat pump 20 so that the refrigerant R is generally in a compressed state (heat releasing) in the condenser 24 and is generally in an expanded state (heat absorbing) in the evaporator 28. The humidity controller 30 includes a first contactor 32 having a hygroscopic material L flowing there through, such as a liquid desiccant including an aqueous lithium chloride solution for example. The heat pump 20 and humidity controller 30 may be thermally coupled together so as to allow the hygroscopic material L to be heated in the condenser 24 and cooled in the evaporator 28. In one embodiment, the first contactor 32 is fluidly coupled to the condenser 24 and the evaporator 28 through a first conduit 34 and a second conduit 36, respectively.

As illustrated in FIG. 1, the hygroscopic material L may be driven by a pump 38 to flow sequentially through the condenser 24, the first contactor 32, and the evaporator 28. However, it is to be understood that the fluid pump 38 may be reversed to allow the hygroscopic material L to flow sequentially through the evaporator 28, the first contactor 32, and then condenser 24.

A first blower 40 is configured to generate an airflow A over the adjacent first contactor 32. The first blower 40 may be an electric fan positioned adjacent to the first contactor 32 and configured to blow outdoor air, or an air outlet of a heating ventilation and air conditioning (HVAC) system for example. In one embodiment, such as when the device 10 is used in a hot and humid climate for example, the airflow A provided by the first blower 40 includes airstreams provided by multiple sources. For example, the airflow A may include a first airstream A1 having generally cool, dry air and a second airstream A2 having generally hot, humid air. In one embodiment, the first airsteam A1 includes return air provided from an adjacent air conditioned facility and the second airstream A2 includes outdoor, ambient air. Though in the illustrated embodiment, the airflow A is shown having two airstreams, an airflow A having additional airstreams or sources is within the scope of the invention. As the airflow A from the first blower 40 passes over the first contactor 32, heat and/or water transfers between the airflow A and the hygroscopic material L in the first contactor 32. In one embodiment, the first contactor 32 serves as a desorber, removing moisture to regenerate the hygroscopic material L.

The humidity controller 30 may additionally include a second contactor 42 through which the hygroscopic material L flows. The second contactor 42 may also be thermally coupled to the evaporator 28 and the condenser 24 through a third conduit 44 and a fourth conduit 46, respectively. As illustrated in FIG. 1, the hygroscopic material L may be driven by the fluid pump 38 sequentially through the evaporator 28, the second contactor 42, and the condenser 24. Here again, the fluid pump 38 may be reversed to allow the hygroscopic material L to flow sequentially through the condenser, the second contactor, and the evaporator.

A second blower 48 may be provided to generate an airflow B over the second contactor 42. In one embodiment, the second blower 48 positioned adjacent to the second contactor 42 may include an electric fan configured to blow outdoor, ambient air, or alternatively, the electric fan may be substituted by an air outlet of an HVAC system. As the airflow B passes over the second contactor 42, heat and/or water transfers between the airflow B and hygroscopic material L in the second contactor 42 to allow the device to provide a desirable air temperature and/or humidity. In one embodiment, the second contactor 42 serves as an absorber, transferring moisture from airflow B to the hygroscopic material L.

To facilitate the thermal coupling between the heat pump 20 and humidity controller 30, the evaporator 28 and the condenser 24 may be configured as refrigerant-hygroscopic material heat exchangers, rather than refrigerant-air heat exchangers used in conventional air conditioning systems. As a non-limiting example, the refrigerant-hygroscopic material heat exchangers may be of a shell-and-tube design, in which a bundle of tubes is disposed within an outer shell. In operation, one fluid flows through the tubes and another fluid flows along the tubes (through the shell) to allow heat transfer between the two fluids. Other suitable heat exchangers known to one of ordinary skill in the art are also within the scope of this invention.

Figure 2:
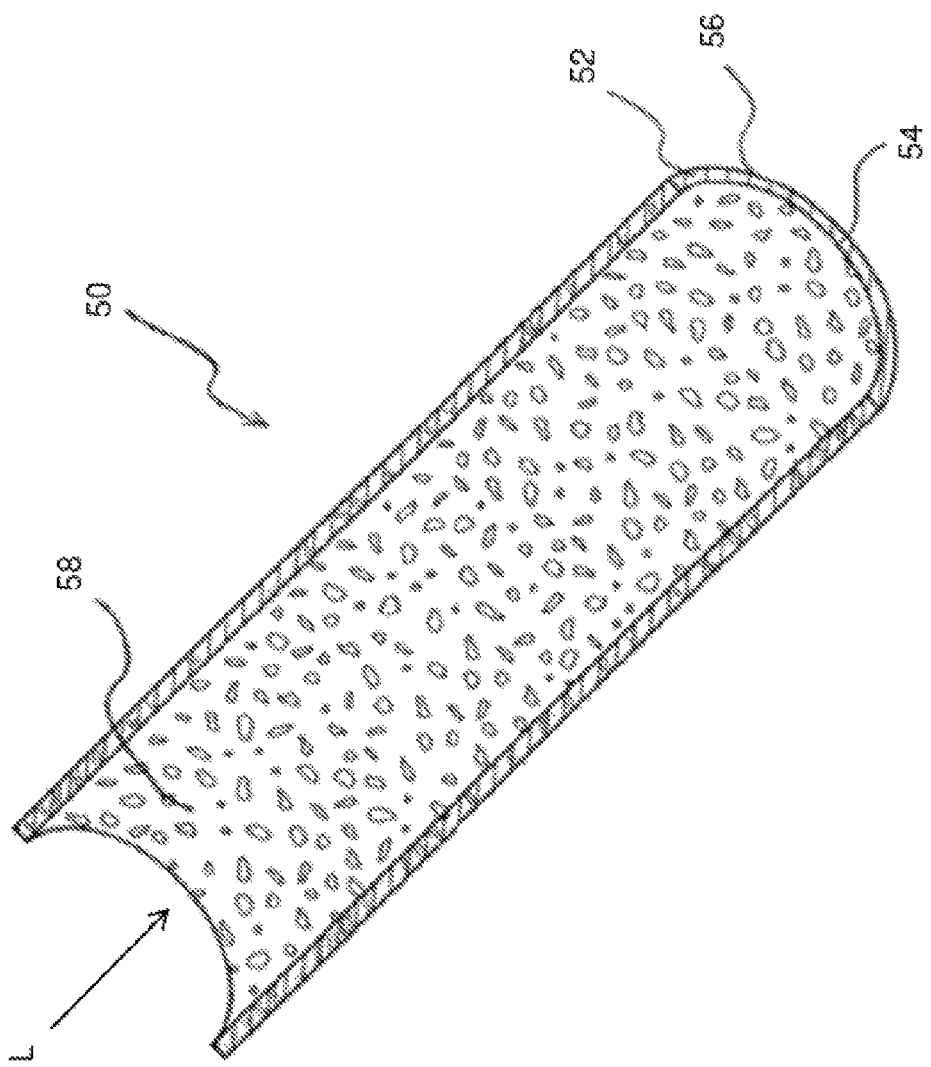
FIG. 2 is perspective view of a cross-section of a contact module of either the first contactor or the second contactor of FIG. 1.

In one non-limiting embodiment, illustrated in FIG. 2, each of the first and second contactors 32, 42 includes at least one contact module 50 having a porous sidewall 52 with an interior side 54 and an external side 56. The interior side 54 of the sidewall 52 defines an internal space 58 through which the hygroscopic material L flows. In one embodiment, the contact modules 50 are substantially tubular in shape. However, contactors 32, 42 that use another known humidity absorbing/desorbing device, such as a flat sheet membrane or a packed tower for example, are within the scope of the invention. Each of the contactors 32, 42 may include at least one end connector (not shown) configured to establish fluid communication between the contact modules 50 and conduits 34, 36, 44, 46. Suitable connectors include pipe manifolds, chamber manifolds, or other connectors generally used in fluid transportation. Alternatively, one or both of the contactors 32, 42 may include only one contact module 50, directly connected to the conduits 34, 36, 44, 46 without any connector.

In order to facilitate humidification and dehumidification, the porous sidewall 52 of the contact module 50 may be permeable to water vapor, and impermeable to the hygroscopic material L so as to form a closed loop. Thus in one embodiment, the porous sidewall 52 is made of a hydrophobic porous material including, but not limited to a plastic porous material for example.

Referring again to FIG. 1, the second contactor 42 is arranged generally downstream of the evaporator 28 so that the hygroscopic material L may be cooled in the evaporator 28 to a temperature below the outdoor, ambient temperature before passing through the second contactor 42. The hygroscopic material L cools the at least one contact module 50 of the second contactor 42 as it flows there through. As a result, the cooled contact modules 50 are configured to absorb heat, for example from the hot and humid airflow B adjacent the exterior side 56 of the contact modules 50. The hygroscopic nature of the hygroscopic material L may cause the hygroscopic material L to absorb water vapor from the airflow B. Thus, the at least one contact module 50 of the second contactor 42 decreases both the temperature and the humidity of the airflow B along its exterior side 56. In hot and humid environments, the device 10 may be configured so that the second contactor 42 is positioned near an interior air vent of a facility to be air-conditioned so that the airflow B, after being cooled and dehumidified by the second contactor 42, can be introduced into the facility for comfort.

The first contactor 32 is positioned downstream of the condenser 24 such that as the hygroscopic material L passes through the condenser 24, the hygroscopic material L is heated to a temperature above the ambient temperature. In one embodiment, each of the multiple airstreams A1, A2 of airflow A is configured to pass over a distinct portion of the first contactor 32. In one embodiment, the first airstream A1 is configured to pass over the sidewalls of a first portion (not shown) of the plurality of contact modules 50. Similarly, the second airstream A2 may be configured to pass over the sidewalls of a second portion (not shown) of the plurality of contact modules 50 in the first contactor 32. The first portion of the contact modules 50, may include a group of adjacent contact modules, such as adjacent a first side of the contactor 32 for example. Alternatively, the first portion may include the plurality of contact modules 50 adjacent the perimeter of the contactor 32, and the second portion may include the plurality of contact modules 50 positioned near the center of the contactor 32. Though the airflow A is described as having a first airstream configured to pass over a first portion of the contactor 32 and a second airstream configured to pass over a second portion of the contactor 32, an airflow A including any number of airstreams and a contactor 32 having any number of portions are within the scope of the invention. In another embodiment, a plurality of airstreams may be configured to pass over portions of adjacent portions of at least one contact module 50 generally in series.

As the heated hygroscopic material L flows through the plurality of contact modules 50 of the first contactor 32, the water vapor pressure differential across the porous sidewall 52 causes the desiccant LD to release water vapor into the airflow A. The resultant hygroscopic material L is more concentrated and hygroscopic than the hygroscopic material L entering the first contactor 32. At the same time, the contact module 50 of the first contactor 32, heated by the hygroscopic material L flowing there through, releases heat to the airflow A along the exterior side 56 of the contact modules 50. Thus, the contact modules 50 of the first contactor 32 may function to increase both the temperature and humidity of the airflow A along its exterior side.

As illustrated in FIG. 1, a conduit 61 extends from adjacent a downstream end of the first contactor 32 and reconnects to the closed desiccant loop, downstream of the second contactor 42 and upstream from the condenser 24, to create an optional bypass loop that bypasses the evaporator and second contactor 42. The bypass loop allows a portion of the hygroscopic material L to be reheated and re-concentrated without going through the cooling and dehumidification process, which facilitates the regeneration of the hygroscopic material L with a higher hygroscopy if desired.

Figure 3:
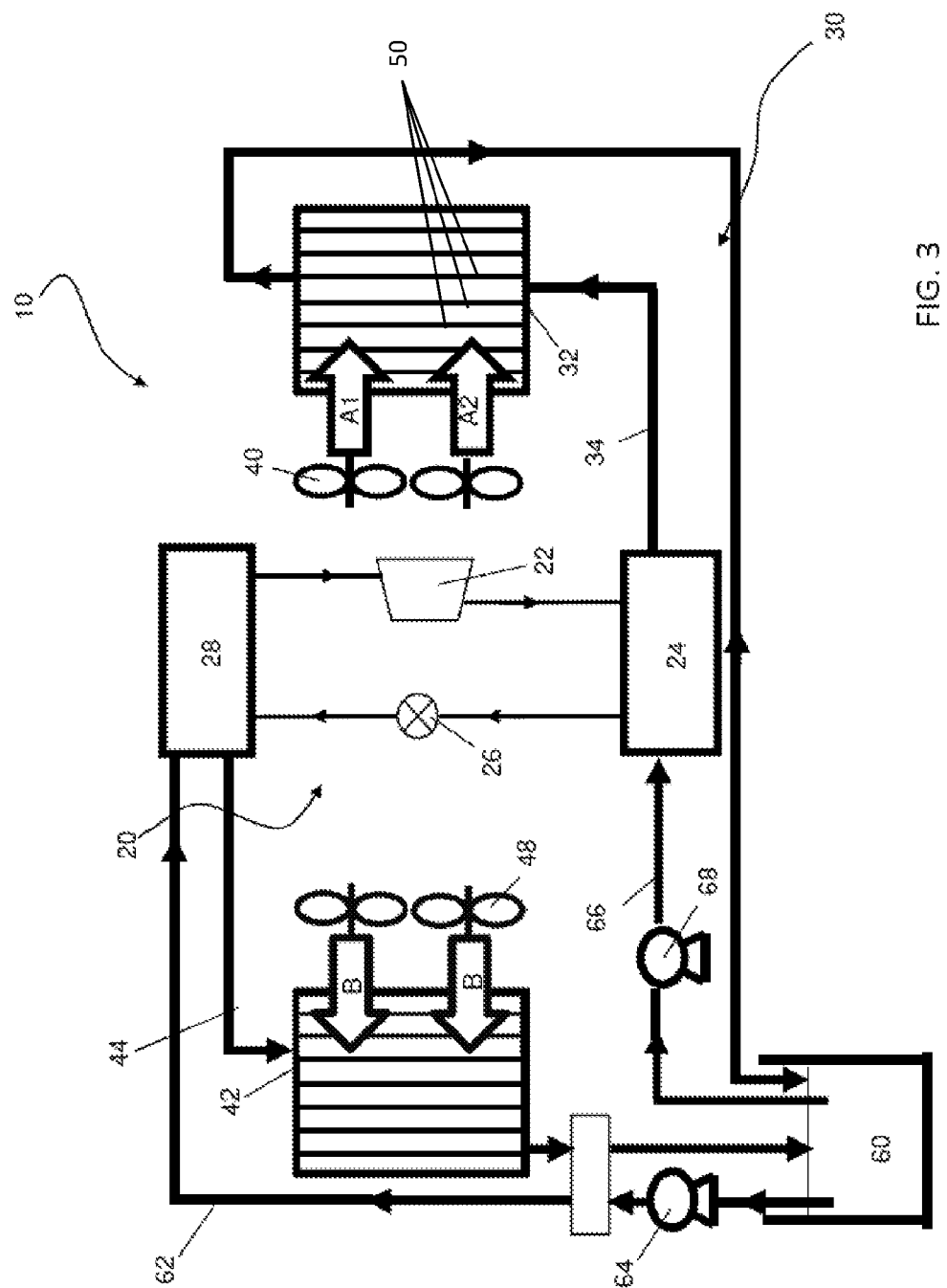
FIG. 3 is a schematic diagram of an air temperature and humidity control device according to another embodiment of the invention.

An alternate configuration of the air temperature and humidity control device 10 is illustrated in FIG. 3. In the illustrated embodiment, the first contactor 32 is fluidly coupled to the condenser 24 and a desiccant storage tank 60 to form a humidification loop, and the second contactor 42 is fluidly coupled to the evaporator 28 and the desiccant storage tank 60 to form a dehumidification loop. The storage tank 60 couples the flow of hygroscopic material L between the humidification and dehumidification loops. Because the hygroscopic material L flows from the storage tank 60 to both the evaporator 28 and the condenser 24, a first fluid pump 64 is arranged within the conduit 62 connecting the storage tank 60 and the evaporator 22 and a second fluid pump 68 is arranged along a conduit 66 extending between the storage tank 60 and the condenser 23. As illustrated in FIG. 3, the hygroscopic material L is driven by the first fluid pump 64 sequentially through the evaporator 28, and the second contactor 42, and returned to the storage tank 60. Similarly, as illustrated, the hygroscopic material L is driven by the second fluid pump 68 sequentially through the condenser 24, the second contactor 42, and back to the storage tank 60. Either fluid pump 64, 68 may be reversed to allow the hygroscopic material L to flow in an opposite direction.

Use of an airflow A including multiple airstreams from different sources to regenerate the hygroscopic material L in the first contactor 32, improves the overall efficiency of the device 10. Application of both return air and outdoor, ambient air to different contact modules 50 within the first contactor 32 lowers the vapor pressure adjacent some of the porous sidewalls, thereby facilitating the transfer of heat and moisture from the hygroscopic material L to the airflow A at the first contactor 32. The device 10 will operate at a high equilibrium desiccant concentration which enhances the moisture transfer in the second contactor 42, thereby increasing the system's capacity and efficiency, particularly when used in a hot and humid ambient environment. In addition, the quantity and/or surface area of contact modules in the first contactor 32 may be reduced.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. A contactor for an air temperature and humidity control device comprising:
   a plurality of contact modules, each contact module having a first portion arranged adjacent a first side of the contactor and a second portion arranged adjacent a second, opposite side of the contactor, the plurality of contact modules having a porous sidewall configured to define an internal space through which a hygroscopic material flows, the first portion being distinct from the second portion;
   a first fan axially aligned with the first portion of the contactor for directing a first airflow over the first portion of the contactor; and
   a second fan axially aligned with the second portion of the contactor for directing a second airflow, distinct from the first airflow, over the first portion of the contactor, wherein the the first airflow and the second airflow are provided to the plurality of contact modules simultaneously.

2. The contactor according to claim 1, wherein the first airflow includes generally cool, dry air.

3. The contactor according to claim 2, wherein the first airflow includes return air provided from an air conditioned facility.

4. The contactor according to claim 2, wherein the first portion of each of the plurality of contact modules are arranged adjacent one another.

5. The contactor according to claim 1, wherein the second airflow includes generally hot, humid air.

6. The contactor according to claim 5, wherein the second airflow includes outdoor, ambient air.

7. The contactor according to claim 1, wherein the second portion of the plurality of contact modules are arranged adjacent one another.

8. An air temperature and humidity control device comprising:
- a heat pump including a condenser, an evaporator, a compressor, and an expansion device through which a refrigerant circulates;
- a humidity controller including a first contactor having a plurality of contact modules, each contact module includes a first portion arranged adjacent a first side of the first contact and a second portion arranged adjacent a second, opposite side of the first contactor, the first portion being distinct from the second portion, and a porous sidewall that defines an internal space through which a hygroscopic material flows; and
- a first blower axially aligned with the first portion of the first contactor for directing a first airflow in communication with the sidewall of the first portion of each of the plurality of contact modules; and
- a second blower axially aligned with the second portion of the first contactor for directing a second airflow, distinct from the first airflow, in communication with the sidewall of the second portion of each of the plurality of contact modules, the first airflow and the second airflow being provided to the first contactor simultaneously.

9. The device according to claim 8, wherein the first airflow includes generally cool, dry air.

10. The device according to claim 9, wherein the first airflow includes return air provided from an air conditioned facility.

11. The device according to claim 8, wherein the second airflow includes generally hot, humid air.

12. The device according to claim 11, wherein the second airflow includes outdoor, ambient air.

13. The device according to claim 8, wherein at least one of the evaporator and the condenser is a refrigerant-hygroscopic material heat exchanger.

14. The device according to claim 8, wherein the porous sidewall is permeable to water vapor and impermeable to the hygroscopic material.

15. The device according to claim 8, wherein the hygroscopic material within the plurality of contact modules of the first contactor releases water and/or heat to the first airflow.

16. The device according to claim 8, wherein the humidity controller further comprises:
- a second contactor including at least one contact module having a porous sidewall that defines an internal space through which a hygroscopic material flows; and
- a second blower for generating an airflow in communication with the sidewall of the at least one contact module of the second contactor.

17. The device according to claim 16, wherein the hygroscopic material within the at least one contact module of the second contactor absorbs water and/or heat from the airflow of the second blower.

18. A method of controlling air humidity and temperature, the method comprising:
- circulating a refrigerant in a heat pump comprising a condenser and an evaporator;
- circulating a hygroscopic material in a humidity controller, the humidity controller comprising a first contactor having a plurality of contact modules, each of which includes a first portion arranged adjacent a first side of the first contactor and a second portion arranged adjacent a second side of the first contactor such that the second portion is located fluidly downstream from the first portion, the plurality of contact modules having a porous sidewall defining an internal space through which the hygroscopic material flows, the first portion being distinct from the second portion;
- directing a first airflow in communication with the sidewalls of only the first portion of each of the plurality of contact modules via a first fan axially aligned with the first portion of the first contactor; and
- directing a second airflow, distinct from the first airflow, in communication with the sidewalls of only the second portion of each of the plurality of contact modules via a second fan axially aligned with the second portion of the first contactor, the first airflow and the second airflow being provided to the first contactor simultaneously.

19. The method according to claim 18, wherein the first airflow includes generally cool, dry air, and the second airflow includes generally hot, humid air.

* * * * *